United States Patent
Tabuchi et al.

(10) Patent No.: US 6,398,845 B1
(45) Date of Patent: Jun. 4, 2002

(54) METHOD FOR PURIFYING ALUMINUM

(75) Inventors: Hiroshi Tabuchi; Ichiro Tanaka, both of Tsukuba; Akihiko Takahashi, Ryugasaki; Hidemitsu Shimizu, Niihama, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/580,432

(22) Filed: May 30, 2000

(51) Int. Cl.$^7$ ............................................. C22B 21/06
(52) U.S. Cl. ..................................................... 75/679
(58) Field of Search ........................................... 75/679

(56) References Cited

U.S. PATENT DOCUMENTS

| | | | |
|---|---|---|---|
| 4,854,968 A | 8/1989 | Otsuka et al. | |
| 4,948,102 A | 8/1990 | Otsuka et al. | |
| 6,156,092 A | * 12/2000 | Tanaka et al. | 75/679 |
| 6,156,095 A | * 12/2000 | Tanaka et al. | 75/679 |

FOREIGN PATENT DOCUMENTS

| JP | 59170227 | 9/1984 |
|---|---|---|
| JP | 5941500 B | 10/1984 |
| JP | 61003385 A | 1/1986 |
| JP | 62158830 A | 7/1987 |
| JP | 0137458 B | 8/1989 |
| JP | 05125462 A | 5/1993 |

OTHER PUBLICATIONS

Energy Saving (Sho Energy), K. Arai et al., vol. 35, No. 4 (1983), pp. 45–48; (English language translation pp. 1–7).
Basis and industrial technology of aluminum material; pp. 342–344 and 347–350; Y. Murakami et al, Dec. 25, 1991; (English language translation pp. 1–6).

* cited by examiner

*Primary Examiner*—Melvyn Andrews
(74) *Attorney, Agent, or Firm*—Birch, Stewart, Kolasch & Birch, LLP

(57) ABSTRACT

A method for purifying aluminum to provided which comprises the steps of maintaining aluminum as a starting material in a molten condition in N+1 vessels; wherein N+1 vessels for molten aluminum and N cooling bodies are provided which are immersed in molten aluminum in the vessels and upon which highly purified aluminum is crystallized on the surfaces thereof. The N+1 vessels are arranged sequentially from 1-st to (N+1)-th and the N cooling bodies are sequentially arranged from 1-st to N-th, respectively, and the vessels and cooling bodies are moved relative to each other.

14 Claims, 2 Drawing Sheets

METHOD FOR PURIFYING ALUMINUM

FIELD OF THE INVENTION

The present invention relates to a method for purifying aluminum and use thereof. More specifically, the present invention relates to a method for producing industrially useful highly purified aluminum in which the amount of eutectic impurities such as Si and Fe are fully reduced by utilizing a segregation theory, and a use of purified aluminum obtained by said method.

BACKGROUND OF THE INVENTION

As a method for purifying aluminum utilizing a segregation theory, there are known a method in which molten aluminum portions near the solid-liquid interface are stirred when cooling to crystallize molten aluminum which is a starting material in a vessel, from lower surface or side surface, a method in which aluminum crystallized on the inner wall of a vessel keeping molten aluminum and on the surface of a cooling body immersed in molten aluminum are scraped and compacted at the bottom of the vessel for molten aluminum by a piston and the like a method in which highly purified aluminum is allowed to crystallize on the surface of a cooling body immersed into molten aluminum while revolving the cooling body, and the like.

Japanese latent Application Publication (JP-B) No. 59-41500 discloses a method for producing highly purified aluminum in which molten aluminum to be purified is charged into a crucible equipped with a stirrer, and aluminum is allowed to crystallize and grow while cooling from the bottom of the crucible and revolving and raising the stirrer.

JP-B No. 1-37458 discloses a method for purifying aluminum in which molten aluminum is kept in a vessel which is equipped with a level floor and has a side wall of heat-insulation structure, and an aluminum crystal is allowed to crystallize on the surface of the floor while stirring the molten aluminum by a stirrer inserted in the molten aluminum and on one hand, passing a cooling medium through a cooling medium flowing tube inside the floor, on the other hand, heating the surface of the molten aluminum.

Japanese Patent Application Laid-Open (JP-A) No. 5-125462 discloses a method for purifying aluminum in which molten aluminum starting material is kept in a vessel, and highly purified aluminum is allowed to crystallize on the bottom of the vessel while thermally insulating the upper part and side part of the vessel under controlled temperature condition, cooling the aluminum from the bottom of the vessel, and revolving the vessel around the center vertical axis, and simultaneously, allowing the molten aluminum in the vessel to rotate by a stirrer toward the reverse direction to the revolving direction of the vessel.

JP-A No. 59-170227 discloses a method for purifying aluminum in which a highly purified aluminum crystal is crystallized on the inner wall of a vessel keeping molten aluminum, this crystal is scraped onto the bottom of the vessel, and the stacked crystal is compacted.

JP-A No. 62-158830 discloses a method for purifying aluminum in which an aluminum crystal crystallized on the surface of a cooling body immersed in molten aluminum is compressed to the bottom of the vessel by a piston, and the remaining molten aluminum is discharged.

JP-B No. 61-3385 discloses a method for purifying aluminum in which highly purified aluminum is crystallized on the surface of a cooling body immersed in molten aluminum while revolving the cooling body under specific condition.

However, in these conventional technologies, impurities in the resultant purified aluminum can not necessarily be reduced sufficiently. In these methods for purifying aluminum utilizing a Segregation theory, the proportion of an eutectic impurity which can be reduced in one purification operation is limited.

In purification methods utilizing a segregation theory, the reduction ratio of an impurity can be represented by the purification coefficient (=concentration of impurity element in purified aluminum/concentration of impurity element in starting aluminum). For example, when molten aluminum containing eutectic impurities such as Si, Fe and the like are purified by a purification method utilizing a segregation theory, the purification coefficients of these eutectic elements are less than 1. Accordingly impurities can be reduced, however, it is generally difficult to reduce the purification coefficient lower than the equilibrium distribution coefficient (=equilibrium concentration of impurity element in purified aluminum/equilibrium concentration of impurity element in molten aluminum) represented by phase diagrams of Al—Si, Al—Fe and the like. Actually, it is generally difficult to reduce the purification coefficient lower than the effective distribution coefficient (distribution coefficient in the case when concentration of impurity element increases more than equilibrium concentration at the molten aluminum side of solid-liquid interface) which is larger than the equilibrium distribution coefficient. Further, when aluminum is industrially purified, about 20 to 70% of molten aluminum is allowed to crystallize, and as a result of increase of the concentration of eutectic impurity elements in molten aluminum, the purification coefficient becomes larger and the amount of the impurities in the resultant purified aluminum can not be reduced sufficiently.

As a industrial method 2 or more continuously combined purification operations, a journal "SHO-ENERGY, vol. 35, no. 4, p.45(1983)" discloses a method, called Kohzyunal Process.

SUMMARY OF THE INVENTION

The object of the present invention is to provide an industrially advantageous method for producing highly purified aluminum in which eutectic impurities such as Si, Fe and the like are sufficiently reduced, and a use of purified aluminum obtained by maid method.

The present inventors have intensively studied a method for purifying aluminum utilizing a segregation theory in view of such conditions, and found an industrially advantageous method for purifying aluminum which can reduce eutectic impurities extremely efficiently by conducting purification process continuously using the specific steps, and have completed the present invention.

Namely, the present invention composed of the following [1] to [15] aspects.

[1] A method for purifying aluminum which comprises steps of;

maintaining aluminum which is a starting material in the form of molten condition in the N+1 vessels at first, wherein N+1 (N is an integer of 2 or more) vessels for molten aluminum and N cooling bodies which highly purified aluminum is crystallized on their surfaces are arranged sequentially, respectively, and repeating a series of processes (1) to (4) twice or more:
wherein a series of processes (1) to (4) is as follows;

(1) a process in which a n-th (n is an integer from 1 to N) cooling body is immersed into molten aluminum in a n-th vessel and highly purified aluminum is allowed to crystallize on the surface of the cooling body, (2) a process in which N cooling bodies which highly purified aluminum has been crystallized on their surface are lifted from molten aluminum, then, the vessels and cooling bodies are relatively moved so that a n-th cooling body can be immersed into molten aluminum in a (n+1)-th vessel, further, aluminum which is a starting material is supplied to the first vessel (herein, it is not necessary to supply aluminum in the last repeating cycle of a series of processes (1) to (4)), (3) a process in which N cooling bodies which highly purified aluminum has been crystallized on their surface are immersed so that a n-th cooling body is immersed into molten aluminum in a (n+1)-th vessel and is heated to melt the highly purified aluminum crystallized on the surface of the cooling body, and (4) a process in which N cooling bodies which highly purified aluminum crystallized on their surfaces has been molten are lifted from molten aluminum, then, the vessels and A cooling bodies are relatively moved so that a n-th cooling body can be immersed into molten aluminum in a n-th vessel, further, molten aluminum purified from a (N+1)-th vessel is recovered (herein, it is not necessary to recover purified aluminum in the last repeating cycle of a series of processes (1) to (4)).

[2] A method for purifying aluminum which comprises steps of:

maintaining aluminum which is a starting material in the form of molten condition in the N+1 vessels at first, wherein N+1 (N is an integer of 2 or more) vessels for molten aluminum and N cooling bodies which highly purified aluminum is crystallized on their surfaces are arranged sequentially, respectively, repeating a series of processes (1) to (4) twice or more, discharging molten aluminum in the first vessel, supplying a part of purified aluminum recovered in the process (4) in the form of molten condition into the first vessel, maintaining aluminum in completion of the preceding cycle in the form of molten condition in the N+1 vessels in the second and following cycles, wherein the first cycle is completed by arranging the first vessel as a (N+1)-th vessel and arranging (n+1)-th (n is an integer from 1 to N) vessel which keeps molten aluminum as a n-th vessel, and conducting the same procedure as in the first cycle except maintaining aluminum which is a starting material in the form of molten condition in the N+1 vessels at first:

wherein a series of processes (1) to (4) is as follows:

(1) a process in which a n-th cooling body is immersed into molten aluminum in a n-th vessel and highly purified aluminum is allowed to crystallize on the surface of the cooling body, (2) a process in which N cooling bodies which highly purified aluminum has been crystallized on their surface are lifted from molten aluminum, then, the vessels and cooling bodies are relatively moved so that a n-th cooling body can be immersed into molten aluminum in a (n+1)-th vessel, further, aluminum which is a starting material is supplied to the first vessel (herein, it is not necessary to supply aluminum in the last repeating cycle of a series of processes (1) to (4)), (3) a process in which N cooling bodies which highly purified aluminum has been crystallized on their surface are immersed so that a n-th cooling body is immersed into molten aluminum in a (n+1)-th vessel and is heated to melt the highly purified aluminum crystallized on the surface of the cooling body, and (4) a process in which N cooling bodies which highly purified aluminum crystallized on their surfaces has been molten are lifted from molten aluminum, then, the vessels and cooling bodies are relatively moved so that a n-th cooling body can be immersed into molten aluminum in a n-th vessel, further, molten aluminum purified from a (N+1)-th vessel is recovered (herein, it is not necessary to recover purified aluminum in the last repeating cycle of a series of processes (1) to (4)).

[3] The method according to [2], wherein the N+1 vessels are linearly arranged sequentially from 1-st to (N+1)-th and in completion of the cycle, the first vessel is moved to the most rear part of the (N+1)-th vessel.

[4] The method for purifying aluminum according to [2], wherein the N+1 vessels are circularly arranged at a constant interval sequentially from 1-st to (N+1)-th and in completion of the cycle, all of the vessels are revolved by 360/(N+1) degree around the center of the circle.

[5] The method for purifying aluminum which comprises steps of:

maintaining aluminum which is a starting material in the form of molten condition in the N+1 vessels, wherein N+1 (N is an integer of 2 or more) vessels for molten aluminum and N cooling bodies which highly purified aluminum is crystallized on their surfaces are arranged sequentially, respectively, repeating a series of processes (1) to (4) twice or more, discharging molten aluminum in the first vessel, transferring molten aluminum in a (n+1)-th (n is an integer from 1 to N) vessel to a n-th vessel sequentially, wherein a part of purified aluminum recovered in the process (4) is supplied in the form of molten condition into the (N+1)-th vessel and the first cycle is completed, maintaining aluminum in completion of the first cycle in the form of molten condition in the N+1 vessels in the second and the following cycle, and conducting the same procedure as in the first cycle except maintaining aluminum which is a starting material in the form of molten condition in the N+1 vessels at first;

wherein a series of processes (1) to (4) is as follows:

(1) a process in which a n-th cooling body is immersed into molten aluminum in a n-th vessel and highly purified aluminum is allowed to crystallize on the surface of the cooling body, (2) a process in which N cooling bodies which highly purified aluminum has been crystallized on their surface are lifted from molten aluminum, then, the vessels and cooling bodies are relatively moved so that a n-th cooling body can be immersed into molten aluminum in a (n+1)-th vessel, further, aluminum which is a starting material is supplied to the first vessel (herein, it is not necessary to supply aluminum in the last repeating cycle of a series of processes (1) to (4)), (3) a process in which N cooling bodies which highly purified aluminum has been crystallized on their surface are immersed so teat a n-th cooling body is immersed into molten aluminum in a (n+1)-th vessel and is heated to melt the highly purified aluminum crystallized on the surface of the cooling body, and (4) a process in which N cooling bodies which highly purified aluminum crystallized on their surfaces has been molten are lifted from molten aluminum, then, the vessels and cooling bodies are relatively moved so that a n-th cooling body can be immersed into molten aluminum in a n-th vessel, further, molten aluminum purified from a (N+1)-th vessel is recovered (herein, it is not necessary to recover purified aluminum in the last repeating cycle of a series of processes (1) to (4)).

[6] The method for purifying aluminum according to [1], wherein N is 2 or 3.

[7] The method for purifying aluminum according to [1], wherein aluminum is kept in the form of molten condition in N+1 vessels at first, wherein the purity of the aluminum is higher than that of aluminum which is a starting material and the purity of aluminum in a (n+1)-th vessel is higher than that of aluminum in a n-th vessel.

[8] The method for purifying aluminum according to [1], wherein a series of processes (1) to (4) are repeated 5 to 15 times in one cycle.

[9] The method for purifying aluminum according to claim 1, wherein, in the process (1), a process in which molten aluminum in the first vessel is discharged and aluminum which is a starting material is supplied in the form of molten condition to the first vessel one or twice in one cycle before a n-th cooling body is immersed in molten aluminum in a n-th vessel.

[10] The method for purifying aluminum according to [1], wherein, in the process (1), a n-th cooling body is immersed in molten aluminum in a n-th vessel, and the molten aluminum is allowed to rotate around the center of the cooling body and a gas which forms gas bubble in the molten aluminum is introduced into the molten aluminum to crystallize highly purified aluminum on the surface of the cooling body.

[11] The method for purifying aluminum according to [10], wherein the gas which forms gas bubble is air.

[12] The method for purifying aluminum according to [1], wherein, in the process (1), a n-th cooling body is immersed in molten aluminum in a n-th vessel, and the cooling body is allowed to revolve to crystallize highly purified aluminum on the surface of the cooling body.

[13] The method for purifying aluminum according to [1], wherein, in the process (1), a n-th cooling body having a periphery temperature of less than the melting point of aluminum is immersed in molten aluminum in a n-th vessel while the n-th cooling body is revolved, or, in the process (2), N cooling bodies which highly purified aluminum has been crystallized on their surface are lifted from molten aluminum while N cooling bodies are revolved, or, a n-th cooling body having a periphery temperature of less than the melting point of aluminum is immersed in molten aluminum in a n-th vessel while the n-th cooling body is revolved in the process (1) and N cooling bodies which highly purified aluminum has been crystallized on their surface are lifted from molten aluminum while N cooling bodies are revolved in the process (2).

[14] The method for purifying aluminum according to [1], wherein, in the whole process, the purification coefficients of Si and Fe (=concentration of impurity element in purified aluminum/concentration of impurity element in starting aluminum) are 0.1 to 0.05, respectively, and the product yield (=amount of recovered product/amount of charged starting material) is over 0.4.

[15] An aluminum foil for an electrolytic capacitor produced by using purified aluminum as a starting material obtained by the method according to [1].

DETAILED DESCRIPTION OF THE PREFERRED EMBODIMENTS

Figure 1:
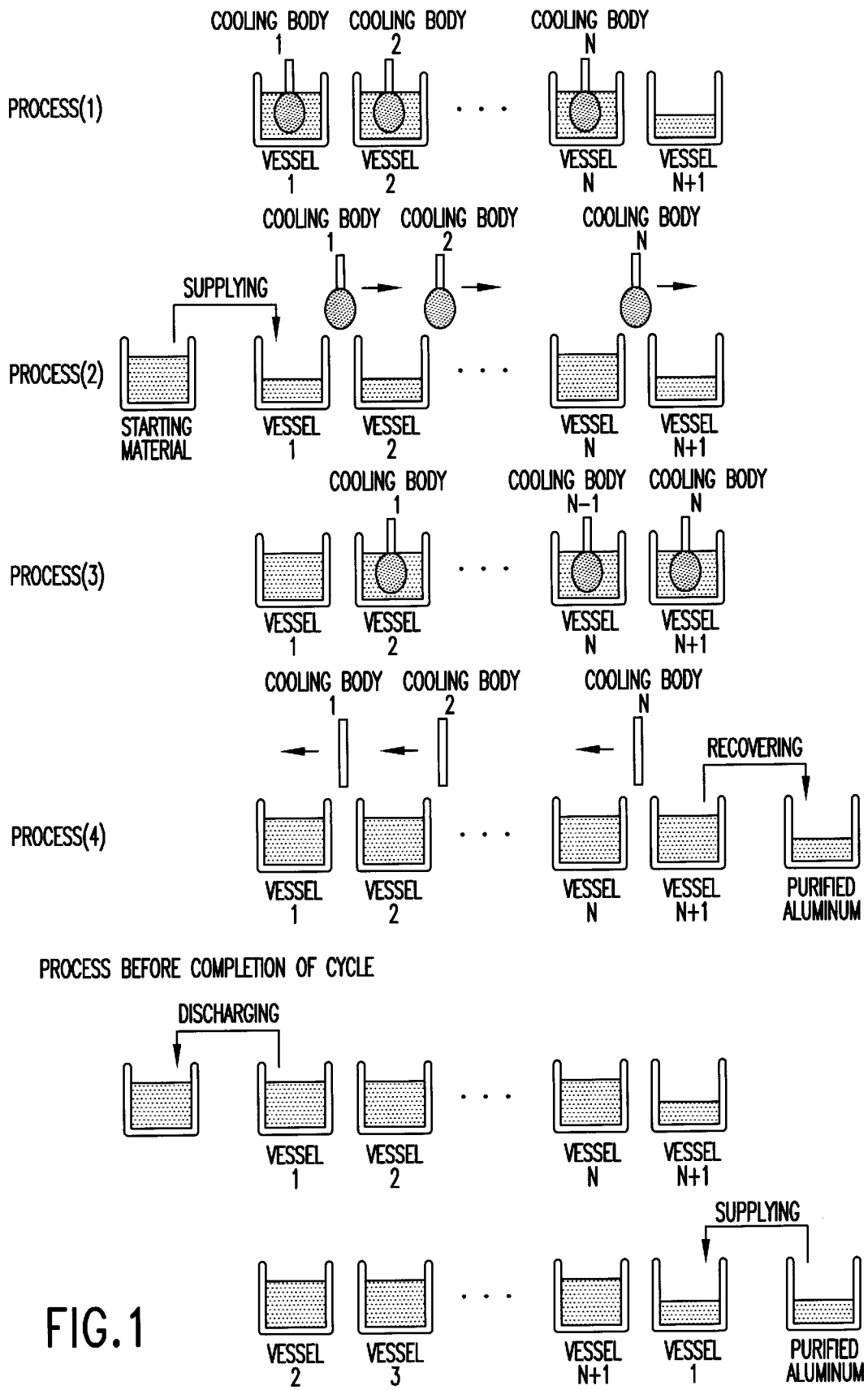
FIG. 1 is a view showing a method in which N+1 vessels are linearly arranged sequentially from 1-st to (N+1)-th.

In the method of the present invention, N+1 vessels for molten aluminum and, N cooling bodies which are immersed in molten aluminum in the vessels and which highly purified aluminum is crystallized on their surfaces are used. The N+1 vessels are arranged sequentially from 1-st to (N+1)-th and the N cooling bodies are sequentially arranged from 1-st to N-th, respectively.

There is no specific restriction on the structure of the vessel and the cooling body. It is preferable that the contact surface with molten aluminum is constituted of a material which does not pollute aluminum or scarcely influences on the purity of aluminum crystallized even if a pollution is occurred. As the material constituting the contact surface with molten aluminum, there can be used, for example, oxide ceramics such as alumina, magnesia, calcia and the like, non-oxide ceramics such as silicon nitride, silicon carbide, boron nitride and the like, and graphite, carbon and the like. Further, it is also used by completing above-mentioned materials, or by surface-treating. Though metals such as iron, stainless and the like usually pollute molten aluminum by contacting with the molten aluminum, it is also used by treating the surface of these metals with the non-polluting substances as described above.

In the method of the present invention, aluminum which is a starting material is first kept in the form of molten condition in the N+1 vessels.

The aluminum used as a starting material for purification contains, as impurities, eutectic elements such as Si, Fe and the like manifesting an eutectic reaction at the aluminum corner of the phase diagram. The aluminum may sometimes also contain peritectic elements such as Ti, V and the like. However, in a purification method utilizing a segregation theory, it is difficult to remove peritectic elements simultaneously with eutectic elements, and there is a tendency that the peritectic elements are condensed to the contrary. Therefore, when these peritectic elements are required to be reduced, it is preferable to conduct what is called boron treatment in which B (boron) is added to molten aluminum to form borides of Ti, V and the like which are separated. Regarding the boron treatment, in many cases, B is added in the form of potassium borofluoride and Al—B alloy to form borides of Ti, V and the like which are precipitated for removal, as described, for example, in "Aluminum Zairyo no Kiso to KogyoGijutsu" (Light Metal Association), p. 343 (1985).

In the method of the present invention, the purity of aluminum used as a starting material is not particularly restricted, and is from about 98 wt % to 99.99 wt %.

Aluminum as a starting material is, for example, molten separately in a melting furnace and the like, and supplied in molten condition into a vessel used for purification, however, there is no problem if the aluminum is supplied in solid state into a vessel, then, molten in the vessel.

In the present invention, when aluminum as a starting material is kept in molten condition in N+1 vessels at first, the purity of aluminum in a (n+1)-th vessel becomes higher than that of aluminum in a n-th vessel, according to the repetition of a series of (1) to (4) processes.

It is preferable that a series of (1) to (4) processes are repeated twice or more, after, aluminum is kept in the form of molten condition in N+1 vessels at first, which aluminum has higher purity than aluminum which is a starting material and the purity of aluminum in a (n+1)-th vessel is higher than the purity of aluminum in a n-th vessel. It is more preferable that the purity of aluminum in N+1 vessels at first is higher than a given purity as follows.

The given purity herein referred to is a purity at which, regarding the purity of aluminum in the form of molten condition in N+1 vessels, molten aluminum in a n-th vessel at the initiation of each purification cycle have the identical purity.

This given purity is a purity of molten aluminum in N+1 vessels in initiating the cycle, after aluminum is kept in molten condition in N+1 vessels at first and the method of the present invention is repeated several cycles or more.

The given purity can also be calculated according to convergence calculation by a personal computer and the like by providing the concentration of impurities in aluminum which is a starting material to be supplied to the first vessel in the process (2), the recovery ratio (%) (=a amount of crystallized aluminum/amount of initial molten aluminum× 100) in the process (1), purification coefficient of impurity elements (=concentration of impurity elements in crystallized aluminum/concentration of impurity elements in molten aluminum before crystallization) in one purification operation, and repetition number of a series of (1) to (4) processes.

It is preferable that aluminum is kept in the form of molten condition in N+1 vessels which aluminum has higher purity than aluminum which is a starting material and the purity of aluminum in a (n+1)-th vessel is not less than a given purity higher than the purity of aluminum in a n-th vessel, when d series of (1) to (4) processes are repeated, purified aluminum having extremely high purity is recovered from the first repetition and the change in purity of purified aluminum recovered from repetition of a series of (1) to (4) processes becomes smaller. The average value of the purity of purified aluminum recovered in one purification cycle shows smaller variation between purification cycles.

A series of processes (1) to (4) in the method of the present invention will be illustrated below.

In the process (1), a n-th cooling body is immersed into molten aluminum in a n-th vessel and highly purified aluminum is allowed to crystallize on the surface of the cooling body.

The method for immersing a cooling body into molten aluminum is not particularly restricted, and the vessel may be moved, the cooling body may be moved, or both of them may be moved.

It is desirable that some cooling means is added to a cooling body, for example, there can be adopted a method in which hollow structure is made and a cooling medium is allowed to circulate through inside, and the like. The cooling medium which is allowed to circulate inside the cooling body is not particularly restricted, and there can be adopted, for example, gases such as air, nitrogen, carbon dioxide, inert gas and the like, liquid such as water, silicone oil and the like. For increasing cooling ability, a gas may be humidified.

Further, as preferable embodiments for further increasing the purity of aluminum crystallized on the surface of a cooling body, the following methods (a)–(c) can be effected.

(a) A method in which molten aluminum is allowed to rotate around the center of a cooling body and a gas which forms gas bubble in the molten aluminum is introduced into the molten aluminum to crystallize highly purified aluminum on the surface of the cooling body.

Alternatively, a method in which molten aluminum is allowed to rotate around the center of a cooling body so that the centrifugal acceleration exerted on the molten aluminum is 0.01 m/s$^2$ or more and 1500 m/s$^2$ or less, and gas bubble is introduced into the molten aluminum so that the introducing amount of a gas which forms gas bubble is from 0.01 to 150 liter (25° C., 1 atm) per 1 kg of aluminum to be crystallized, to crystallize highly purified aluminum on the surface of the cooling body.

In these cases, the gas which forms gas bubble in molten aluminum is preferably a gas which is basically in the form of gas in molten aluminum at its temperature and is not significantly dissolved in the molten aluminum. There can be utilized gases inert to molten aluminum such as helium, argon and the like, gases substantially inert to molten aluminum such as nitrogen and the like, and air, chlorine, chloride gas, or mixed gases thereof. It is more preferable that the gas which forms gas bubble is air. For allowing molten aluminum to rotate around a cooling body, there can be adopted a method in which a cooling body is revolved, a method in which a vessel is revolved, a method in which molten aluminum is rotated by a stirrer or electromagnetic force, and the like.

(b) A method in which a cooling body is revolved to allow highly purified aluminum crystallize on the surface of a cooling body.

(c) A method in which a cooling body is immersed, while revolving, in molten aluminum in this case, the purification time can also be shortened by immersing a cooling body having a peripheral temperature lower than the melting point of aluminum, while revolving, into molten aluminum.

Preferably, in the process (1), a n-th cooling body having a peripheral temperature lower than the melting point of aluminum is immersed in molten aluminum in a n-th vessel while the cooling body is revolving, so that the relative speed of the periphery surface of the cooling body to the molten aluminum is 1000 mm/s or more and less than 8000 mm/s, to crystallize highly purified aluminum on the surface of the cooling body.

When the cooling body is immersed, while revolving, into molten aluminum, it is necessary that the molten aluminum is heated to the melting point or more, preferably 670° C. or more.

The amount of highly purified aluminum to be crystallized on the surface of a cooling body, namely, the recovery ratio (%) (=amount of crystallized aluminum/amount of initial molten aluminum×100) in a unit purification process is preferably from about 20% to 70%, more preferably from 20% to 50%, further more preferably from 20% to 35%.

In the process (2), N cooling bodies which highly purified aluminum has been crystallized on their surfaced are lifted from molten aluminum, then, the vessels and cooling bodies are relatively moved so that a n-th cooling body can be immersed into molten aluminum in a (n+1)-th vessel, further, aluminum which is a starting material is supplied to the first vessel.

It is preferable for obtaining higher purified aluminum that there can be conducted a method in which N cooling bodies which highly purified aluminum has been crystallized on their surfaces are lifted, while revolving, from molten aluminum.

In the process (2), it is more preferable that a method in which N cooling bodies which highly purified aluminum has been crystallized on their surfaces are lifted, while revolving so that the relative speed of the periphery surface of the cooling body to the molten aluminum is 500 mm/s or more and less than 4000 mm/s, from molten aluminum.

Further, in the process (1) and the process (2), any one of the method in which a cooling body is immersed, while revolving, into molten aluminum [process (1)] and the method in which N cooling bodies which highly purified aluminum has been crystallized on their surfaces are lifted, while revolving, from molten aluminum [process (2)] may be adopted, or, both of them may be adopted.

The method in which a cooling body is lifted from molten aluminum and the method in which a vessel and a tooling body are relatively moved are not particularly restricted, and a vessel may be moved, a cooling body may be moved, or both of them may be moved. For example, there can be adopted a method in which cooling bodies and vessels are arranged at a constant interval, the cooling bodies are lifted simultaneously, then, the vessels are moved simultaneously, and the like.

Regarding the amount of molten aluminum in the first vessel, since the amount of highly purified aluminum crystallized on the surface of the first cooling body has been reduced lower than the amount of aluminum charged as a starting material, aluminum as a starting material is supplied in an amount corresponding to the reduction amount. However, in the last repetition of a series of processes (1) to (4), said supply is not necessary since molten aluminum in the first vessel is discharged thereafter.

In the process (3), N cooling bodies which highly purified aluminum has been crystallized on their surfaces are immersed so that a n-th cooling body is immersed into molten aluminum in a (n+1)-th vessel and is heated to melt the highly purified aluminum crystallized on the surface of the cooling body.

The method for immersing a cooling body into molten aluminum is not particularly restricted as in the process (1), and a vessel may be moved, a cooling body may be moved, or both of them may be moved.

The heating means for melting the highly purified aluminum crystallized on the surface of a cooling body is not particularly restricted, and the molten aluminum can be heated indirectly from the periphery surface of the vessel or directly from the surface of the molten aluminum, using burning of fuel gases such as fuel oils like heavy oil, light oil, kerosene and the like, fuel gases like propane gas, liquefied petroleum gas and the like, or using a resistance heating heater utilizing electricity, and the like. It has no problem to provide a heating means inside a cooling body, and the cooling body is heated.

Further, in melting highly purified aluminum crystallized on the surface of a cooling body, the melting can also be promoted by allowing the molten aluminum to rotate around the cooling body or allowing the cooling body immersed in the molted aluminum to revolve.

In the process (4), N cooling bodies which highly purified aluminum crystallized on their surfaces has been molten dr lifted from molten aluminum, than, the vessels and cooling bodies are relatively moved so that a n-th cooling body can be immersed into molten aluminum in a n-th vessel, further, molten aluminum purified from a (N+1)-th vessel is recovered.

The method for lifting a cooling body from molten aluminum and the method for relatively moving a vessel and a cooling body are not particularly restricted as in the process (2).

Regarding the amount of molted aluminum in the (N+1)-th vessel, since the amount of highly purified aluminum melted from the surface of a N-th cooling body in the process (3) has increased, purified aluminum in an amount corresponding to the increase amount is recovered. However, in the last repetition of a series of processes (1) to (4), recovery is not necessary since a (N+1)-th vessel becomes a N-th vessel thereafter or molten aluminum in a (N+1)-th vessel is transferred into a N-th vessel.

In the method of the present invention, a series of processes (1) to (4) described in detail above are repeated twice or more.

By repetition of melting in a (n+1)-th vessel of highly purified aluminum crystallized on the surface of a n-th cooling body in a n-th vessel molten aluminum in a vessel of higher number has higher purity, and purified molten aluminum recovered from a (N+1)-th vessel will be aluminum having extremely higher purity.

The repetition number of a series of processes (1) to (4) is not particularly restricted provided it is twice or more, and when the repetition number is too low, the product yield (amount of recovered product/amount of charged starting material) is lower, and further, with increase in the repetition numbers molten aluminum in a vessel of lower number has lower purity, and resultantly, the purity of purified molten aluminum recovered from a (N+1)-th vessel decreases. The preferably repetition number is from 5 to 15 times.

In the present invention, N is an integer of 2 or more, and is not particularly restricted. When N is larger, the purity of purified molten aluminum recovered from a (N+1)-th vessel becomes higher, however, when N is increased too much, an enormous facility is required. N is preferably 2 or 3, from the standpoints of the impurity concentration (100 to 10000 ppm) in aluminum usually used as a starting material, and the impurity concentration (10 to 100 ppm) in purified aluminum usually used.

In the present invention, a series of processes (1) to (4) are repeated twice or more.

It is preferable that after the series of processes (1) to (4) are repeated twice or more, molten aluminum in the first vessel is discharged and a part of purified aluminum recovered in the process (4) is supplied in the form of molten condition into the first vessel. The first cycle is completed by arranging the first vessel as a (N+1)-th vessel and arranging (n+1)-th (n is an integer from 1 to N) vessel which keeps molten aluminum as a n-th vessel. In the second and following cycles, aluminum in completion of the preceding cycle is kept in the form of molten condition in the N+1 vessels, then, a series of processes (1) to (4) are repeated twice or more.

As described above, with the increase in the repeating times of a series of processes (1) to (4), molten aluminum in a vessel of lower number has lower purity. After repetition of a series of processes (1) to (4) for given times, since the purity of molten aluminum in the first vessel becomes so low that aluminum purified to desired purity can not be obtained even if a series of processes (1) to (4) are repeated more than given times, molten aluminum in the first vessel is discharged, said vessel is arranged as a (N+1)-th vessel, and a part of purified molten aluminum recovered in the process (4) which has been repeated previously is supplied to said vessel. Since the purity of molten aluminum in the second vessel is relatively high, said vessel is arranged as the first vessel, and likewise, a (n+1)-th vessel is arranged as a n-th vessel.

The first cycle is completed by these number change of vessels, discharging and supplying of molten, aluminum in completion of the preceding cycle is kept in the form of molten condition in the N+1 vessels, then, a series of processes (1) to (4) are repeated twice or more, enabling continuous and stable purification of aluminum.

It is preferable that N+1 vessels are linearly arranged Sequentially from 1-st to (N+1)-th and in completion of the cycle, the first vessel is moved to the most rear part of the (N+1)-th vessel. Further, it is also preferable that N+1 vessels are circularly arranged at a constant interval sequentially from 1-st to (N+1)-th and in completion of the cycle, all of the vessels are revolved by 360/(N+1) degree around the center of the circle. By adopting such an embodiment, more quick transition to the following cycle can be achieved, and increase in productivity can be accomplished.

In the preferable embodiment of the present invention, a vessel is moved in completion of the cycle, however, a method in which a cooling body is relatively moved instead of the vessel can also be adopted.

During repetition for given times of a series of processes (1) to (4), in the process (1), it is also one preferable embodiment of the present invention that before a n-th cooling body is immersed into molten aluminum in a n-th vessel, molten aluminum in the first vessel is discharged and a starting material, aluminum, is supplied in the form of molten condition into the first vessel, and molten aluminum in the n-th vessel is discharged and aluminum having higher purity than aluminum discharged from the n-th vessel is supplied in the form of molten condition into the n-th vessel, and in these cases, the purity of purified aluminum recovered from a (N+1)-th vessel is further improved or the repetition number of a series of processes (1) to (4) can be increased.

Figure 2:
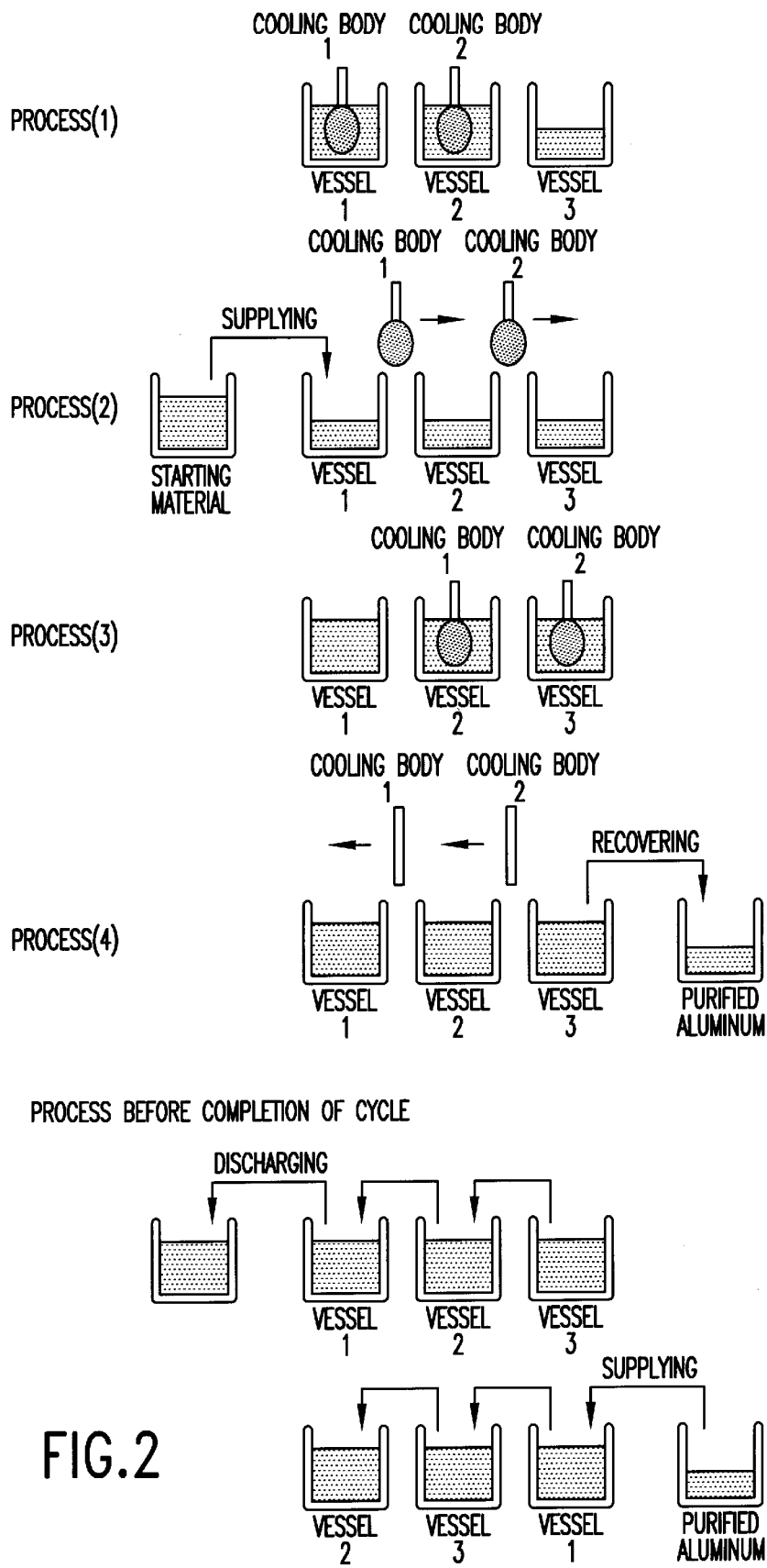
FIG. 2 is a view showing a method in which N+1 vessels are linearly arranged sequentially from 1-st to (N+1)-th, wherein N is 2.

In the present invention, a method in which N+1 vessels are linearly arranged sequentially from 1-th to (N+1)-th is shown in FIG. 1, and a method wherein N is 2 is shown in FIG. 2.

In another method of the present invention, a series of processes (1) to (4) are repeated twice or more, then, molten aluminum in the first vessel is discharged, and the first cycle is completed by transferring molten aluminum in a (n+1)-th vessel to a n-th vessel sequentially and supplying a part of purified aluminum recovered in the process (4) in the form of molten condition into the (N+1)-th vessel. In the second and following cycles, aluminum in completion of the preceding cycle is kept in the form of molten condition in the N+1 vessels, then, a series of processes (1) to (4) are repeated twice or more.

After repetition of a series of processes (1) to (4) for given times, since the purity of molten aluminum in the first vessel becomes so low that aluminum purified to desired purity can not be obtained even if a series of processes (1) to (4) are repeated more times, molten aluminum in the first vessel is discharged. Since the purity of molten aluminum in the second vessel is relatively high, this molten aluminum is transferred to the first vessel, and likewise, molten aluminum in a (n+1)-th vessel is transferred a n-th vessel sequentially. As a result, since a (N+1)-th vessel becomes vacant, a part of purified molten aluminum recovered in the process (4) which has been repeated previously is supplied to the vacant vessel.

The first cycle is completed by transition and supply of these molten aluminum. In the second and following cycles, aluminum in completion of the preceding cycle is kept in the form of molten condition in the N+1 vessels, then, a series of processes (1) to (4) are repeated twice or more, enabling continuous and stable purification.

According to the present invention, eutectic impurities can be reduced extremely efficiently at a higher production yield (=amount of recovered product/amount of charged starting material) of over 0.4.

In a known purification method utilizing a segregation theory, the purification coefficients of Si and Fe (=concentration of impurity element in purified aluminum/concentration of impurity element in starting aluminum) in one purification operation are about 0.2 and 0.1, respectively, when the production yield is about 0.2 to 0.5. For obtaining smaller purification coefficient, twice purification operations are required, as a result, the total purification coefficients of Si and Fe decrease to about 0.1 or less and about 0.05 or less, respectively, however, the production yield decreases to about 0.25 or less.

On the other hand, in the method of the present invention in which a series of (1) to (4) processes are repeated twice or more after aluminum is kept in the form of molten condition in N+1 vessels at first, which aluminum has higher purity than aluminum which is a starting material and the purity of aluminum in a (n+1)-th vessel is not less than a given purity higher than the purity of aluminum in a n-th vessel: the total purification coefficients of Si and Fe decrease to about 0.1 or less and about 0.05 or less, respectively, and a higher production yield of over 0.4 can be attained, when the recovery ratio (%) (=amount of crystallized aluminum/amount of initial molten aluminum× 100) in the process (1) is about 0.25, the purification coefficients of Si and Fe in a unit purification process are about 0.2 and 0.1 as the known method, N is 2 and the repetition number of a series of processes (1) to (4) is 10 times.

In the present invention, even in a method wherein aluminum, which is a starting material, having a purity of less than the given purity is kept in the form of a molten condition into all of N+1 vessels, then, a series of processes (1) to (4) are repeated twice or more, with the increase in cycle number, the total purification coefficients of Si and Fe decrease to about 0.1 or less and about 0.5 or less, respectively, and further, a higher production yield of over 0.4 can be attained.

Purified aluminum obtained by the method of the present invention can be used as a starting material of an aluminum foil for an electrolytic capacitor.

The purified aluminum obtained by the method of the present invention can be processed into an aluminum foil for an electrolytic capacitor via processes such as slab casting, heat rolling, cold rolling, foil rolling and the like, as described, for example, in "Aluminum Zairyo no Kiso to KogyoGijutsu" (Aggregate Corporation, Keikinzoku Kyokai), pp. 347 to 350 (1985).

EXAMPLE

The following examples illustrate the present invention, but do not limit the scope of the present invention. Among the following examples, Examples 5 and 6 show simulation results obtained according to convergence calculation by a personal computer, by using purification coefficients of impurity elements Si and Fe (=concentration of impurity element in crystallized aluminum/concentration of impurity element in molten aluminum before crystallization), in one purification operation in the process (1) obtained by experiments in Reference Example, of 0.2 and 0.08, and determining the concentration of impurities in aluminum in the form of molten condition in respective vessels at first, the concentration of impurities in aluminum which is a starting material to be supplied to the first vessel in the process (2), the recovery ratio (%) (=amount of crystallized aluminum/amount of initial molten aluminum×100) in the process (1), and the repetition number of a series of processes (1) to (4).

Example 1

In the method of the present invention in which N+1 vessels are circularly arranged at a constant interval sequentially from 1-st to (N+1)-th, wherein N is 2, aluminum having Si and Fe concentrations of 130 and 65 ppm, respectively, was kept in the first vessel, aluminum having Si and Fe concentrations of 15 and 4 ppm, respectively, was kept in the second vessel, and aluminum having Si and Fe concentrations of 12 and 2 ppm, respectively, was kept in the third vessel, respectively, in the form of molten condition.

Then, the following processes (1) to (4) were repeated 10 times.

[Process (1)]

The first cooling body was immersed in molten aluminum in the first vessel, and the second cooling body was immersed in molten aluminum in the second vessel, and aluminum was allowed to crystallize on the surfaces of the cooling bodies until respective recovery ratios reached about 25%.

[Process (2)]

The two cooling bodies which aluminum had been crystallized on their surfaces were lifted from molten aluminum, then, a circular stand carrying the vessels was revolved by 120 degree so that the first cooling body could be immersed in molten aluminum in the second vessel and the second cooling body could be immersed in molten aluminum in the third vessel, and aluminum as a starting material having Si and Fe concentrations of 210 and 270 ppm, respectively, was supplied into the first vessel in an amount corresponding to the crystallization amount in the process (1). (herein, said supply was not conducted at the last repetition of a series of processes (1) to (4)).

[Process (3)]

The two cooling bodies which aluminum had been crystallized on their surfaces were immersed so that the first cooling body was immersed in molten aluminum in the second vessel and the second cooling body was immersed into molten aluminum in the third vessel and heated to melt aluminum crystallized on the surfaces of the cooling bodies.

[Process (4)]

The two cooling bodies which aluminum crystallized on their surfaces had been melted were lifted from molten aluminum, then, a circular stand carrying the vessels was revolved by 120 degree so that the first cooling body could be immersed in molten aluminum in the first vessel and the second cooling body could be immersed in molten aluminum in the second vessel, and molten aluminum purified from the third vessel was recovered in an amount corresponding to the crystallization amount in the process (1). (herein, said recovery was not conducted at the last repetition of a series of processes (1) to (4))

In the process (1), the cooling body was revolved when immersing into molten aluminum, and further, the cooling body was revolved when crystallizing aluminum to allow molten aluminum to rotate around the cooling body and air was introduced in bubble condition into molten aluminum. In the process (2), the cooling body was revolved when lifting from molten aluminum.

At the seventh cycle in 10 times repetition of a series of processes (1) to (4), in the process (1), before the first cooling body was immersed into molten aluminum in the first vessel, molten aluminum in the first vessel was discharged, and aluminum which is a starting material having concentrations of Si and Fe of 210 and 270 ppm, respectively, was supplied in the form of molten condition into the first vessel.

After the 10-th repetition (?), molten aluminum in the first vessel was discharged, 3-times portions of purified aluminum recovered 9 times in the process (4) was supplied in the form of molten condition into the first vessel and a disk carrying the vessels was revolved by 120 degree (360 degree/(N=3)), and the first vessel was arranged as the third vessel, the second vessel was arranged as the first vessel and the third vessel was arranged as the second vessel. A procedure until this process is considered as the first cycle, and in the second and following cycles, aluminum in completion of the preceding cycle is kept in the form of molten condition in three vessels, then, a series of processes (1) to (4) described above were repeated 10 times as in the first cycle.

In one cycle, the average concentrations of Si and Fe contained in purified aluminum recovered in the process (4) were 9 and 4 ppm, respectively, and the concentrations were almost constant in respective cycles. The total purification coefficients for Si and Fe were 0.04 and 0.01, respectively. The total product yield was 0.5, which is a ratio of the product amount calculated by subtracting aluminum supplied to the first vessel after 10 repetition of a series of processes (1) to (4) from purified aluminum recovered 9 times in the process (4), to the amount of aluminum which is a starting material supplied once in the process (1) and supplied 9 times in the process (2).

Example 2

In the method of the present invention in which N+1 vessels are circularly arranged at a constant interval sequentially from 1-st to (N+1)-th, wherein N is 2, aluminum having Si and Fe concentrations of 110 and 50 ppm, respectively, was kept in the first vessel, aluminum having Si and Fe concentrations of 12 and 4 ppm respectively was kept in the second vessel, and aluminum having Si and Fe concentrations of 10 and 3 ppm respectively was kept in the third vessel, respectively, in the form of molten condition.

Purification of aluminum was conducted in the same manner as in Example 1 except that the repetition number of a series of processes (1) to (4) was 9, and at the sixth cycle in repetition of a series of processes (1) to (4), in the process (1), before the first cooling body was immersed into molten aluminum in the first vessel, molten aluminum in the first vessel was discharged, and aluminum as a starting material having concentrations of Si and Fe of 210 and 270 ppm, respectively, was supplied in the form of molten condition into the first vessel.

In one cycle, the average concentrations of Si and Fe contained in purified aluminum recovered in the process (4) were 7 and 3 ppm, respectively, and the concentrations were almost constant in respective cycles. The total purification coefficients for Si and Fe were 0.03 and 0.01, respectively.

The total product yield was 0.45, which is a ratio of the product amount calculated by subtracting aluminum supplied to the first vessel after 9 repetition of a series of processes (1) to (4) from purified aluminum recovered 8 times in the process (4), to the amount of aluminum which is a starting material supplied once in the process (1) and supplied 8 times in the process (2).

Example 3

In the method of the present invention in which N+1 vessels are circularly arranged at a constant interval sequentially from 1-st to (N+1)-th, wherein N is 2, aluminum having Si and Fe concentrations of 120 and 70 ppm, respectively, was kept in the first vessel, aluminum having Si and Fe concentrations of 15 and 4 ppm, respectively, was kept in the second vessel, and aluminum having Si and Fe concentrations of 12 and 3 ppm, respectively, was kept in the third vessel, respectively, in the form of molten condition.

Purification of aluminum was conducted in the same manner as in Example 2 except that air was not introduced into molten aluminum in the process (1).

In one cycle, the average concentrations of Si and Fe contained in purified aluminum recovered in the process (4) were 9 and 3 ppm, respectively, and the concentrations were almost constant in respective cycles. The total purification coefficients for Si and Fe were 0.04 and 0.01, respectively. The total product yield was 0.45, which is a ratio of the product amount calculated by subtracting aluminum supplied to the first vessel after 9 repetition of a series of processes (1) to (4) from purified aluminum recovered 8 times in the process (4), to the amount of aluminum which is a starting material supplied once in the process (1) and supplied 8 times in the process (2).

Example 4

In the method of the present invention in which N+1 vessels are circularly arranged at a constant interval sequentially from 1-st to (N+1)-th, wherein N is 2, aluminum having Si and Fe concentrations of 150 and 70 ppm, respectively, was kept in the first vessel, aluminum having Si and Fe concentrations of 17 and 4 ppm, respectively, was kept in the second vessel, and aluminum having Si and Fe concentrations of 13 and 3 ppm, respectively, was kept in the third vessel, respectively, in the form of molten condition.

Purification of aluminum was conducted in the name manner as in Example 2 except that at the sixth cycle in 9 times repetition of a series of processes (1) to (4), in the process (1), before the first cooling body was immersed into molten aluminum in the first vessel, molten aluminum in the first vessel was not discharged, and aluminum as a starting material having concentrations of Si and Fe of 210 and 270 ppm respectively was not supplied in the form of molten condition into the first vessel.

In one cycle, the average concentrations of Si and Fe contained in purified aluminum recovered in the process (4) were 10 and 5 ppm, respectively, and the concentrations were almost constant in respective cycles. The total purification coefficients for Si and Fe were 0.05 and 0.02, respectively. The total product yield was 0.63, which is a ratio of the product amount calculated by subtracting aluminum supplied to the first vessel after 9 repetition of a series of processes (1) to (4) from purified aluminum recovered 8 times in the process (4), to the amount of aluminum which is a starting material supplied 8 times in the process (2).

Reference Example

Aluminum having Si and Fe concentrations of 200 and 330 ppm, respectively, was kept in the form of molten condition in a vessel, a cooling body was immersed in this vessel, and aluminum was allowed to crystallize on the surface of the cooling body until the recovery ratio reached about 25%. In this operation, the cooling body was revolved when immersing into molten aluminum, and further, the cooling body was revolved when crystallizing aluminum to allow molten aluminum to rotate around the cooling body, and air was introduced in bubble condition into molten aluminum. The cooling body which aluminum was crystallized on the surface was lifted from molten aluminum, then, aluminum crystallized on the surface of the cooling body was separated and recovered in the form of purified aluminum from the cooling body. The cooling body was revolved when lifting from molten aluminum.

The concentrations of Si and Fe in purified aluminum were 39 and 26 ppm, respectively, and the purification coefficients mere 0.2 and 0.08, respectively.

Example 5

In the method of the present invention in which N+1 vessels are circularly arranged at a constant interval sequentially from 1-st to (N+1)-th, wherein N is 2, aluminum having Si and Fe concentrations of 140 and 85 ppm, respectively, is kept in the first vessel, aluminum having Si and Fe concentrations of 18 and 4 ppm, respectively, is kept in the second vessel, and aluminum having Si and Fe concentrations of 14 and 2 ppm, respectively, is kept in the third vessel, respectively, in the form of molten condition.

[Process (1)]

The first cooling body is immersed in molten aluminum in the first vessel, and the second cooling body is immersed in molten aluminum in the second vessel, and aluminum is allowed to crystallize on the surfaces of the cooling bodies until respective recovery ratios reach about 25%.

[Process (2)]

The two cooling bodies which aluminum have been crystallized on their surfaces are lifted from molten aluminum, then, a disk carrying the vessels is revolved by 120 degree so that the first cooling body can be immersed in molten aluminum in the second vessel and the second cooling body can be immersed in molten aluminum in the third vessel, and aluminum as a starting material having Si and Fe concentrations of 200 and 330 ppm, respectively, is supplied into the first vessel in an amount corresponding to the crystallization amount in the process (1). (herein, said supply is not conducted at the last repetition of a series of processes (1) to (4))

[Process (3)]

The first cooling body is immersed in molten aluminum in the second vessel and the second cooling body is immersed into molten aluminum in the third vessel and heated to melt aluminum crystallized on the surfaces of the cooling bodies.

[Process (4)]

The two cooling bodies which aluminum crystallized on their surface have been melted are lifted from molten aluminum, then, a disk carrying the vessels is revolved by 120 degree so that the first cooling body can be immersed in molten aluminum in the first vessel and the second cooling body can be immersed in molten aluminum in the second vessel, and molten aluminum purified from the third vessel is recovered in an amount corresponding to the crystallization amount in the process (1). (herein, recovery is not conducted at the last repetition of a series of processes (1) to (4)).

A series of processes (1) to (4) described above are repeated 10 times.

Then, molten aluminum in the first vessel is discharged, 3-times portions of purified aluminum recovered 9 times in the process (4) is supplied in the form of molten condition into thee first vessel and a disk carrying the vessels is revolved by 120 degree, and the first vessel is arranged as the third vessel, the second vessel is arranged as the first vessel and the third vessel is arranged as the second vessel. A procedure until this process is considered as the first cycle, and in the second and following cycles, aluminum in completion of the preceding cycle is kept in the form of molten condition in three vessels, then, a series of processes (1) to (4) described above are repeated 10 times.

In one cycle, the average concentrations of Si and Fe contained in purified aluminum recovered in the process (4) are 10 and 1 ppm, respectively, and the concentrations are almost constant in respective cycles. The total purification coefficients for Si and Fe are 0.05 and 0.006, respectively. The total product yield is 0.67, which is a ratio of the product amount calculated by subtracting aluminum transferred to the first vessel after 10 repetition of a series of processes (1) to (4) from purified aluminum recovered 9 times in the process (4), to the amount of aluminum which is a starting material supplied 9 times in the process (2).

Example 6

In the method of the present invention in which N+1 vessels are circularly arranged at a constant interval sequentially from 1-st to (N+1)-th, wherein N is 2, aluminum having Si and Fe concentrations of 200 and 330 ppm, respectively, in kept in the first, second and third vessels, respectively, in the form of molten condition.

A series of processes (1) to (4) as in Example 5 are repeated 10 times.

Then, molten aluminum in the first vessel is discharged, 3-times portions of purified aluminum recovered 9 times in the process (4) is supplied in the form of molten condition into the first vessel and a disk carrying the vessels is revolved by 120 degree, and the first vessel is arranged as the third vessel, the second vessel is arranged as the first vessel and the third vessel is arranged as the second vessel. A procedure until this process is considered as the first cycle, and in the second and following cycles, aluminum in completion of the preceding cycle is kept in the form of molten condition in three vessels, then, a series of processes (1) to (4) described above are repeated 10 times.

In the first cycle the average concentrations of Si and Fe contained in purified aluminum recovered in the process (4) are 110 and 150 ppm, respectively, in the second cycle, the average concentrations of Si and Fe are 34 and 27 ppm, respectively, and in the third cycle, the average concentrations of Si and Fe are 18 and 6 ppm, respectively, and in the following cycles, the average concentrations of Si and Fe becomes lower. In the third and following cycles, the total purification coefficients for Si and Fe are 0.1 or less and 0.02 or less, respectively. The total product yield is 0.67, according to the same as in Example 1.

Comparative Example 1

Aluminum having Si and Fe concentrations of 210 and 270 ppm, respectively, was kept in the form of molten condition in a vessel, a cooling body was immersed in this vessel, and aluminum was allowed to crystallize on the surface of the cooling body. In this operation, the cooling body was revolved when immersing into molten aluminum, and further, the cooling body was revolved when crystallizing aluminum to allow molten aluminum to rotate around the cooling body, and air was introduced in bubble condition into molten aluminum. The cooling body which aluminum was crystallized on the surface was lifted from molten aluminum, then, aluminum crystallized on the surface of the cooling body was separated and recovered in the form of purified aluminum from the cooling body. The cooling body was revolved when lifting from molten aluminum.

The concentrations of Si and Fe in purified aluminum were 38 and 16 ppm, respectively,.and the purification coefficients were 0.18 and 0.06, respectively. The recovery ratio was about 25% and the production yield was 0.25.

Comparative Example 2

Purification of aluminum was conducted in the same manner as in Comparative Example 1. Purified aluminum thus obtained was used as a starting material, and the same operation was repeated to obtain further purified aluminum.

The concentrations of Si and Fe in purified aluminum were 7 and 1 ppm, respectively, and the purification coefficients were 0.03 and 0.01 respectively. The total production yield was 0.13.

The results of the above-described Examples and Comparative Examples are summarized in Table 1.

TABLE 1

| | Purification coefficient | | Production |
|---|---|---|---|
| | Si | Fe | yield |
| Example 1 | 0.04 | 0.01 | 0.5 |
| Example 2 | 0.03 | 0.01 | 0.45 |
| Example 3 | 0.04 | 0.01 | 0.45 |
| Example 4 | 0.05 | 0.02 | 0.63 |
| Example 5 | 0.05 | 0.006 | 0.67 |
| Example 6 | <0.1 | <0.02 | 0.67 |
| Comparative example 1 | 0.18 | 0.06 | 0.25 |
| Comparative example 2 | 0.03 | 0.01 | 0.13 |

As apparent from the results shown above, according to the present invention, the purification coefficients for Si and Fe are 0.1 or less and 0.05 or less, respectively, and a higher production yield over 0.4 can be achieved. It is known that, as compared with Comparative Example 1 in which the production yield is 0.25, the purification coefficient is reduced to 50% or less, and an eutectic impurity can be removed efficiently. Further, it is apparent that, as compared with Comparative Example 2 in which the purification coefficient is equivalent, the production yield increases 3.5-fold or more, and high productivity and economy can be realized.

According to the present invention, highly purified aluminum can be crystallized from molten aluminum containing eutectic impurities such as Si, Fe and the like.

Further, the resulted highly purified aluminum is suitably used as a foil for an electrolytic capacitor, sputtering target, hard disk substrate, superconductivity stabilizer, bonding wire and the like.

What is claimed is:

1. A method for purifying aluminum which comprises the steps of:

maintaining aluminum as a starting material in a molten condition in N+1 vessels, wherein N+1 vessels for molten aluminum and N cooling bodies upon which highly purified aluminum is crystallized on the surfaces thereof are arranged sequentially, respectively, where N is an integer of 2 or greater, and repeating steps (1) to (4) below at least twice;
   (1) a n-th cooling body is immersed into said molten aluminum in a n-th vessel and highly purified aluminum is allowed to crystallize on the surface of the cooling body, where n is an integer from 1 to N,
   (2) N cooling bodies upon which highly purified aluminum has been crystallized on the surface thereof are lifted from said molten aluminum, and then, the vessels and cooling bodies are moved relative to each other so that a n-th cooling body can be immersed into molten aluminum in a (n+1)-th vessel, and further, aluminum which is a starting material is supplied to the first vessel,
   (3) N cooling bodies upon which highly purified aluminum has been crystallized on their surface are immersed so that a n-th cooling body is immersed into molten aluminum in a (n+1)-th vessel and is heated to melt the highly purified aluminum crystallized on the surface of the cooling body, and
   (4) N cooling bodies upon which highly purified aluminum is crystallized on their surfaces are lifted from molten aluminum, then, the vessels and cooling bodies are moved relative to each other so that a n-th cooling body can be immersed into molten aluminum in a n-th vessel, and further, molten aluminum purified from a (N+1)-th vessel is recovered.

2. A method for purifying aluminum which comprises the steps of:
   maintaining aluminum as a starting material in a molten condition in the N+1 vessels, wherein N+1 vessels for molten aluminum and N cooling bodies upon which highly purified aluminum is crystallized on their surfaces are arranged sequentially, respectively, where N is an integer of at least 2,
   repeating steps (1) to (4) at least twice,
   discharging molten aluminum in the first vessel, supplying a part of purified aluminum recovered in the step (4) in molten form into the first vessel,
   maintaining aluminum upon completion of the preceding cycle in molten form in the N+1 vessels in the second and following cycles, wherein the first cycle is completed by arranging the first vessel as a (N+1)-th vessel and arranging (n+1)-th vessel which keeps molten aluminum as a n-th vessel, where n is an integer from 1 to N, and
   repeating the same procedure as in the first cycle except initially maintaining aluminum which is a starting material in the form of molten condition in the N+1 vessels;
   wherein steps (1) to (4) are as follows:
      (1) a n-th cooling body is immersed into molten aluminum in a n-th vessel and highly purified aluminum is allowed to crystallize on the surface of the cooling body,
      (2) N cooling bodies upon which highly purified aluminum has been crystallized on their surface are lifted from molten aluminum, then, the vessels and cooling bodies are moved relative to each other so that a n-th cooling body can be immersed into molten aluminum in a (n+1)-th vessel, further, aluminum which is a starting material is supplied to the first vessel,
      (3) N cooling bodies upon which highly purified aluminum has been crystallized on their surface are immersed so that a n-th cooling body is immersed into molten aluminum in a (n+1)-th vessel and is heated to melt the highly purified aluminum crystallized on the surface of the cooling body, and
      (4) N cooling bodies upon which highly purified aluminum is crystallized on their surfaces are lifted from molten aluminum, then, the vessels and cooling bodies are moved relative to each other so that a n-th cooling body can be immersed into molten aluminum in a n-th vessel, further, molten aluminum purified from a (N+1)-th vessel is recovered.

3. The method according to claim 2, wherein the N+1 vessels are linearly arranged sequentially from 1-st to (N+1)-th and in completion of the cycle, the first vessel is moved to the most rearward portion of the (N+1)-th vessel.

4. The method for purifying aluminum according to claim 2, wherein the N+1 vessels are circularly arranged at a constant interval sequentially from 1-st to (N+1)-th and in completion of the cycle, all of the vessels revolve by 360/(N+1) degree around the center of the circle.

5. A method for purifying aluminum which comprises the steps of:
   maintaining aluminum as a starting material in the form of molten condition in the N+1 vessels,
   wherein N+1 vessels for molten aluminum and N cooling bodies upon which highly purified aluminum is crystallized on their surfaces are arranged sequentially, respectively, wherein N is an integer of at least 2,
   repeating a series of steps (1) to (4) twice or more,
   discharging molten aluminum in the first vessel,
   transferring molten aluminum in a (n+1)-th vessel to a n-th vessel sequentially, wherein n is an integer from 1 to N,
   wherein a part of purified aluminum recovered in step (4) is supplied in molten condition into the (N+1)-th vessel and the first cycle is completed,
   maintaining aluminum upon completion of the first cycle in molten condition in the N+1 vessels in the second and the following cycle, and
   conducting the same procedure as in the first cycle except aluminum which is a starting material is maintained in molten condition in the N+1 vessels at first:
   wherein a series of steps (1) to (4) is as follows:
      (1) a n-th cooling body is immersed into molten aluminum in a n-th vessel and highly purified aluminum is allowed to crystallize on the surface of the cooling body,
      (2) N cooling bodies upon which highly purified aluminum has been crystallized on their surface are lifted from molten aluminum, then, the vessels and cooling bodies are moved relative to each other so that a n-th cooling body can be immersed into molten aluminum in a (n+1)-th vessel, further aluminum which is a starting material is supplied to the first vessel,
      (3) N cooling bodies upon which highly purified aluminum has been crystallized on their surface are immersed so that a n-th cooling body is immersed into molten aluminum in a (n+1)-th vessel and is heated to melt the highly purified aluminum crystallized on the surface of the cooling body, and
      (4) N cooling bodies upon which highly purified aluminum crystallized on their surfaces are lifted from molten aluminum, then, the vessels and cooling bodies are moved relative to each other so that a n-th cooling body can be immersed into molten aluminum in a n-th vessel, further, molten aluminum purified from a (N+1)-th vessel is recovered.

6. The method for purifying aluminum according to claim 1, wherein N is 2 or 3.

7. The method for purifying aluminum according to claim 1, wherein aluminum is maintained initially in molten condition in N+1 vessels, wherein the purity of the aluminum is higher than that of aluminum which is a starting material and the purity of aluminum in a (n+1)-th vessel is higher than that of aluminum in a n-th vessel.

8. The method for purifying aluminum according to claim 1, wherein said series of steps (1) to (4) are repeated 5 to 15 times in one cycle.

9. The method for purifying aluminum according to claim 1, wherein, in step (1), molten aluminum in the first vessel is discharged and aluminum which is a starting material is supplied in molten condition to the first vessel once or twice in one cycle before a n-th cooling body is immersed in molten aluminum in a n-th vessel.

10. The method for purifying aluminum according to claim 1, wherein, in step (1), a n-th cooling body is immersed in molten aluminum in a n-th vessel, and the molten aluminum is allowed to rotate around the center of the cooling body and a gas which forms gas bubbles in the molten aluminum is introduced into the molten aluminum to crystallize highly purified aluminum on the surface of the cooling body.

11. The method for purifying aluminum according to claim 10, wherein the gas which forms gas bubbles is air.

12. The method for purifying aluminum according to claim 1, wherein, in the process (1), a n-th cooling body is immersed in molten aluminum in a n-th vessel, and the cooling body is allowed to revolve to crystallize highly purified aluminum on the surface of the cooling body.

13. The method for purifying aluminum according to claim 1,
wherein, in step (1), a n-th cooling body having a surface temperature of less than the melting point of aluminum is immersed in molten aluminum in a n-th vessel while the n-th cooling body rotates, or, in step (2), N cooling bodies upon which highly purified aluminum has been crystallized on their surface are lifted from molten aluminum while N cooling bodies are revolved, or, a n-th cooling body having a surface temperature less than the melting point of aluminum is immersed in molten aluminum in a n-th vessel while the n-th cooling body is rotated in the step (1) and N cooling bodies upon which highly purified aluminum has been crystallized on their surface are removed from molten aluminum while N cooling bodies are revolved in the process (2).

14. The method for purifying aluminum according to claim 1, wherein, the purification coefficients of Si and Fe determined as the concentration of said elements in purified aluminum/concentration of said elements in said starting aluminum ranges from 0.1 to 0.05, respectively, and the product yield determined as the amount of recovered product/amount of charged starting material is over 0.4.

* * * * *